Patented Feb. 22, 1944

2,342,175

UNITED STATES PATENT OFFICE 2,342,175

WATER-SOLUBLE POLYVINYL HALOGEN DERIVATIVES

William H. Wood, Bedford, Ohio, assignor to Harris-Seybold-Potter Company, Cleveland, Ohio, a corporation of Ohio No Drawing. Application June 19, 1939, Serial No. 279,939

7 Claims. (Cl. 260—90)

In common methods of preparing plates for lithographic printing, the plate usually of zinc or aluminum is coated with a water solution of albumin which has been previously made sensitive to the action of light by the addition of a sensitizing agent such as ammonium chromate or dichromate. After the plate has been coated and allowed to dry, it is exposed to light in the form of an image of the subject to be printed. The light hardens the albumin coating to the solvent action of water, thus forming a reproduction of the subject in hardened albumin and leaving the remaining portion of the albumin coating relatively unhardened. A suitable developing ink is applied to the coating and then the unhardened areas are removed by dissolving them away with water. After application of an etching solution to clean the non-image portions of the plate and render them receptive to water, the plate is in condition for printing.

I have found that certain reaction products of polyvinyl alcohol or suitable derivative thereof with halogen constitute excellent materials for use as colloidal coatings in making plates for printing in the lithographic manner. Such reaction products are considerably superior for this purpose to the untreated polyvinyl alcohol or its esters or ethers or partial esterification or etherification products. Plates coated with such products, after they have been suitably sensitized to light, are characterized by a uniform high light sensitivity, including sensitivity to light rays of other than the ultra-violet or violet or blue regions of the spectrum. They may be easily developed and they show remarkable resistance to chemical agents as well as wear and so are serviceable for a much longer period than lithographic plates as heretofore made. Furthermore, such improved coating material exhibits a resinous characteristic whereby it becomes intimately bonded with the surface of the metal plates to which it is applied when heated to a suitable temperature, i. e., above 110 degrees C. Plates coated with my improved material, properly treated, have a life many times that of albumin coated plates. The utility of my new products is however not limited to this particular field of use. The characteristic of forming a resinous material which intimately bonds with the metal surfaces when heated and the smooth homogeneous character of the resultant film render these products desirable as coatings for protective purposes generally. Furthermore, they take dyes excellently and so are available where decorative effect and not merely protection is desired in a coating. Also by depositing these halogenated products in the form of a film on a surface from which such film after drying can be stripped, sheets or foils thereof useful in various ways may be readily made.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Polyvinyl alcohol as at present commercially available comes in the form of a white dry powder, but the viscosity in a given water solution varies, corresponding with what is termed a low, medium and high viscosity product. Presumably the difference in viscosity is attributable to differences in the degree of polymerization of the alcohol. My halogenated derivative may be made from the polymerized alcohol, irrespective of the viscosity or degree of polymerization. Likewise, as raw material for my halogenating treatment, I may employ the water-soluble ethers and partial esters of polyvinyl alcohol, the ethers being of the lower members of the series, ethyl, formyl, propionyl, and butyl, the normal ethers or the partial ethers both being water-soluble. The ethers may be prepared in different ways, for instance one known through U. S. Patent 1,971,662 is from reacting upon the polyvinyl alcohol with an alkylene oxide. And, the water-soluble partial esters are of the lower members of the fatty acid series, formic, acetic, propionic and butyric. The partial esters may be prepared by special control in the esterifying operation, or more practically by controlled hydrolysis of a normal ester. The acetate is particularly easy to make and is inexpensively available. The partial esters differ from the normal esters in being water-soluble. All of the raw materials mentioned foregoing as for use in the present process are water-soluble. Such raw materials may be made as required or conveniently are commercially available under the trade names for instance "RH 488," "RH 428," "RH 489," "RH 403," "RH 471."

The water-soluble material, whether polyvinyl alcohol or its ethers or partial esters, is, in accordance with my process, dissolved in water and is agitated and the halogen is supplied, the supply being controlled so as to leave the halogenated product water-soluble.

For example: Medium viscosity polyvinyl alcohol is dissolved in water to a 3 per cent solution, and the solution is agitated and a stream of gaseous chlorine is led into the solution at a rate of approximately 30 liters per hour per liter of solution. The time of chlorination desirably may be from 3 to 10 minutes, somewhat tougher coatings resulting from the longer exposure time. The temperature of the solution during the chlorination is preferably 80 to 90° C.

The chlorinated derivative of the foregoing operation, in dry form is a fine, white, granular powder readily dissolving in water at 80° C. to give a white iridescent solution. It dissolves somewhat more slowly at lower temperatures. The brominated derivative, which is formed in similar manner as the chlorinated derivative, except that bromine or bromine water is used instead of chlorine gas, is likewise a fine, white, granular powder which has practically the same characteristics as to solubility. To form the iodine derivative, again substantially the same procedure is followed, the iodine being preferably derived from ammonium iodide with the addition of either a little bromine or chlorine to set the iodine free therefrom. However, I have not succeeded in precipitating the resulting derivative which forms a solution of blue black color, and is somewhat more viscous than the solution of the polyvinyl alcohol from which it is made whereas a corresponding solution of the chlorinated or brominated derivative is less viscous than the original polyvinyl alcohol solution. The halogenated products of the water-soluble ethers and partial esters are similar in their general characteristics to the halogenated products of the polyvinyl alcohol, the principal difference being that the halogenated ether and partial ester derivatives are somewhat more easily soluble in water than the halogenated alcohol derivatives.

The water solution of the halogenated polyvinyl alcohol or ethers or partial esters may then be used as a coating solution, for instance in coating plates for lithographic use, these being thereupon sensitized and further treated in the conventional manner, although it may be remarked that the new coating material also lends itself to special treatments which do not form a part of the present invention, but as a result of which further superior characteristics may be developed.

This application is a continuation, in part and as to common subject matter, of my application Ser. No. 148,667, filed June 17, 1937.

Other modes of applying the principle of the invention may be employed, change being made as regards the details described, provided the features stated in any of the following claims, or the equivalent of such, be employed.

I therefore particularly point out and distinctly claim as my invention:

1. In a process of the character described, changing the nature of a member of the group consisting of polyvinyl alcohol and its ethers and esters which are water-soluble by halogenating the same in aqueous medium and controlling the supply of halogen to an amount yielding a product soluble in water.

2. In a process of the character described, changing the nature of a member of the group consisting of polyvinyl alcohol and its ethers and esters which are water-soluble by chlorinating the same in aqueous medium and controlling the supply of chlorine to an amount yielding a product soluble in water.

3. In a process of the character described, changing the nature of a member of the group consisting of polyvinyl alcohol and its ethers and esters which are water-soluble by brominating the same in aqueous medium and controlling the supply of bromine to an amount yielding a product soluble in water.

4. In a process of the character described, changing the nature of polyvinyl alcohol by supplying halogen to the same and controlling the supply of halogen to an amount yielding a product soluble in water.

5. In a process of the character described, changing the nature of polyvinyl alcohol by supplying chlorine to the same and controlling the supply of chlorine to an amount yielding a product soluble in water.

6. In a process of the character described, changing the nature of polyvinyl alcohol by supplying bromine to the same and controlling the supply of bromine to an amount yielding a product soluble in water.

7. In a process of the character described, agitating a solution of polyvinyl alcohol of about three per cent concentration in water and introducing gaseous chlorine at the rate of about thirty liters per hour per each liter of solution for a period of about three to ten minutes, while maintaining the temperature of the solution at about 80–90° C., whereby water-soluble halogenated products remain.

WILLIAM H. WOOD.